United States Patent [19]

Kishida et al.

[11] Patent Number: 5,192,968
[45] Date of Patent: Mar. 9, 1993

[54] PHOTOMETER

[75] Inventors: Kenichi Kishida; Atsushi Maruyama; Akira Watanabe, all of Tokyo, Japan

[73] Assignee: Olympus Optical Co., Ltd., Tokyo, Japan

[21] Appl. No.: 790,478

[22] Filed: Nov. 12, 1991

[30] Foreign Application Priority Data

Nov. 14, 1990 [JP] Japan .................. 2-309910

[51] Int. Cl.⁵ .................. G03B 7/08; G01J 1/46; H01J 40/14
[52] U.S. Cl. .................. 354/410; 356/215; 356/218; 250/214 DC; 250/214 P
[58] Field of Search .................. 354/402, 410; 358/213.19; 356/215, 218, 226; 250/214 DC, 214 P

[56] References Cited

U.S. PATENT DOCUMENTS

| 4,920,370 | 4/1990 | Taniguchi et al. | 354/402 |
| 4,931,822 | 6/1990 | Yamano | 354/402 |
| 5,005,039 | 4/1991 | Hamada et al. | 354/402 |
| 5,023,646 | 6/1991 | Ishida et al. | 354/402 |
| 5,028,948 | 7/1991 | Yamasaki | 354/402 |

Primary Examiner—W. B. Perkey
Attorney, Agent, or Firm—Frishauf, Holtz, Goodman & Woodward

[57] ABSTRACT

A photometer of a camera employs a MOS-type CPU having an open drain type transistor whose drain serving as an output terminal, a CMOS input terminal, and an input gate inverting an input with a value exceeding a predetermined potential. In the photometer, the transistor is set in a high-impedance state, thereby releasing a charge accumulated in a parasitic capacitor of a photodiode for generating a photoelectric current corresponding to an incident light amount. Thus, a voltage at the CPU terminal gradually increases, and, when it exceeds a threshold of a Schmitt inverter, the output of the Schmitt inverter is inverted. The time period from when the transistor is set in the high-impedance state to when the output of the Schmitt inverter is inverted is proportional to the photoelectric current. By measuring the time period, the photoelectric current value or luminance is detected.

13 Claims, 7 Drawing Sheets

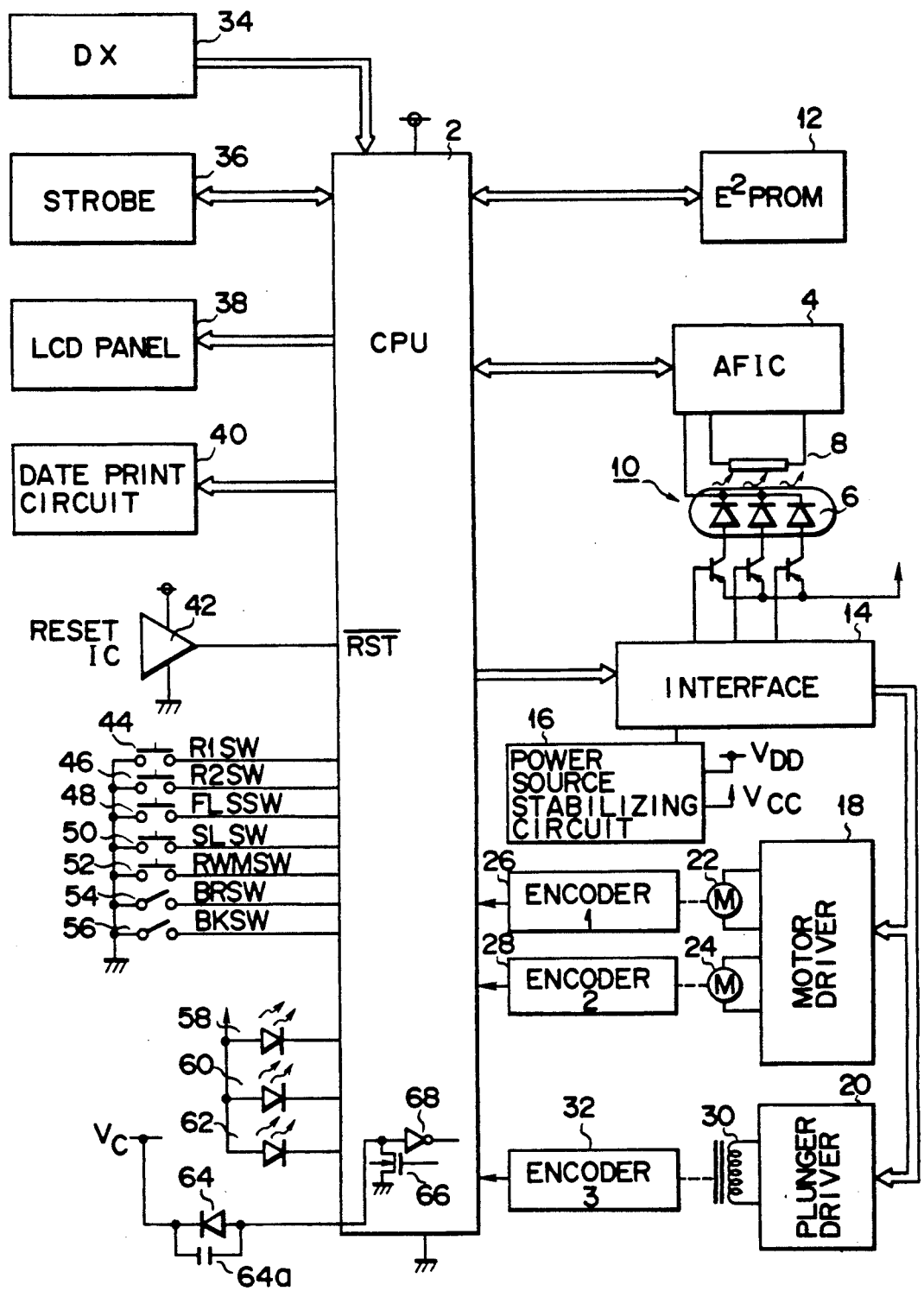
F I G. 1

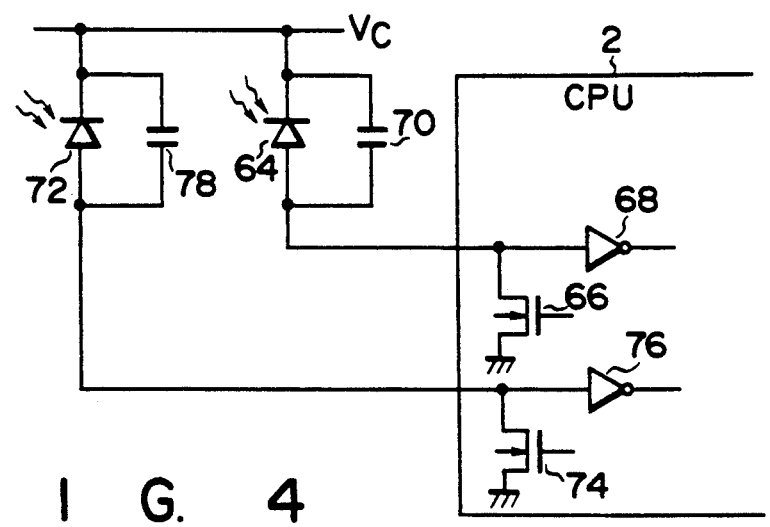
F I G. 4
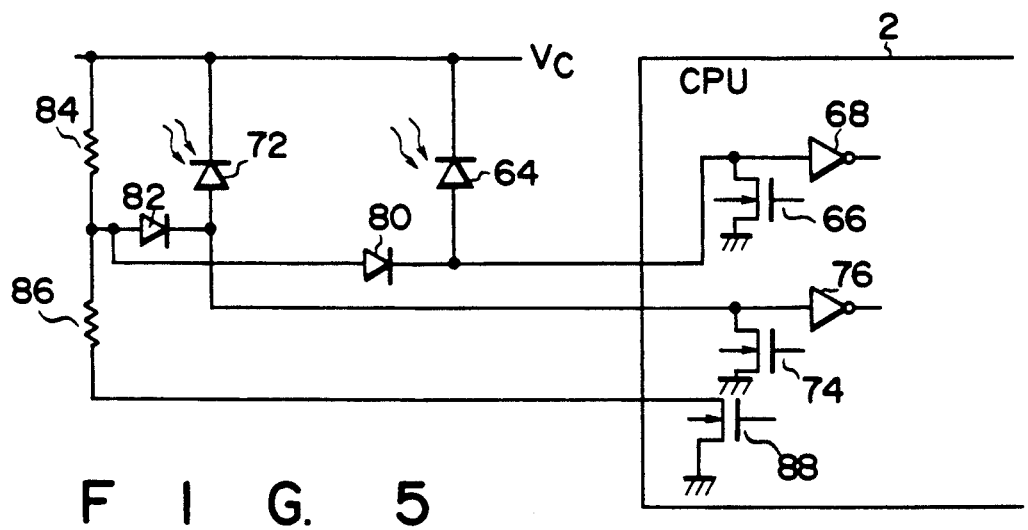
F I G. 5
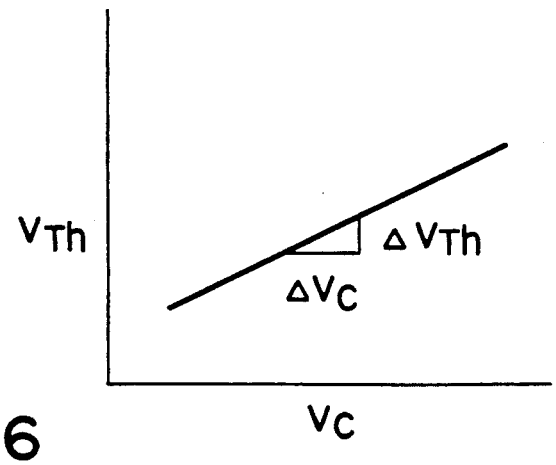
F I G. 6

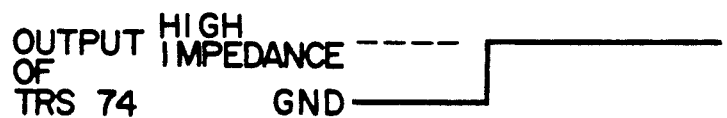
F I G. 7A
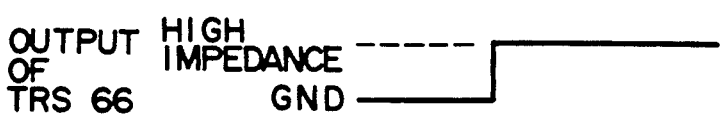
F I G. 7B
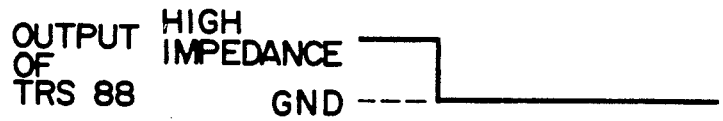
F I G. 7C
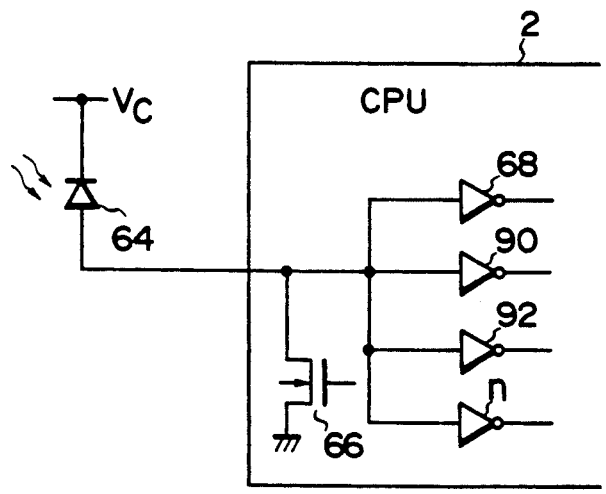
F I G. 8

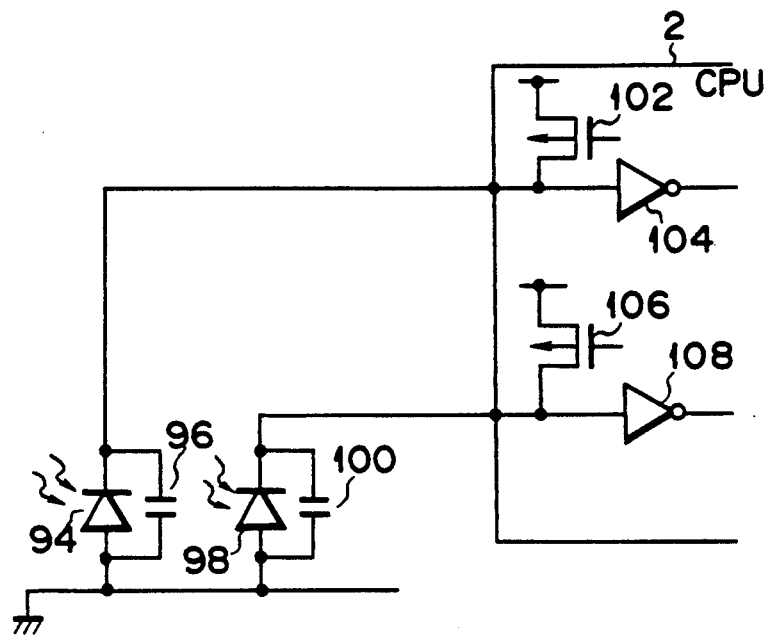
F I G. 9
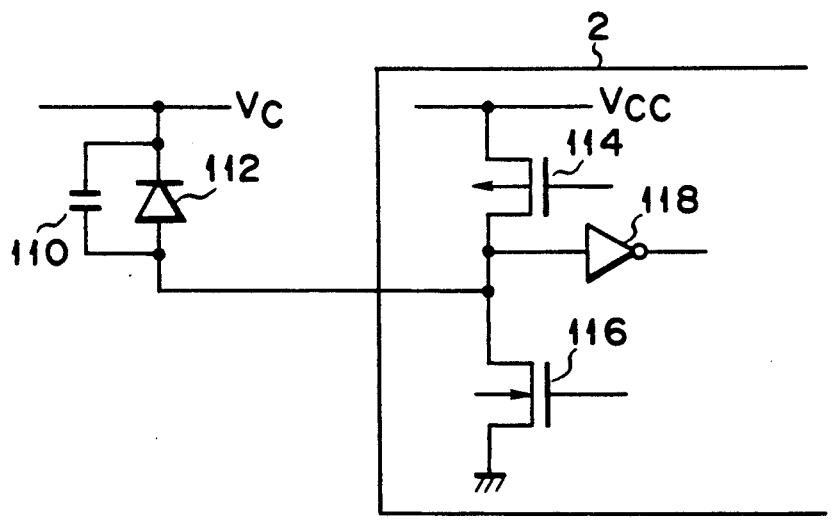
F I G. 11

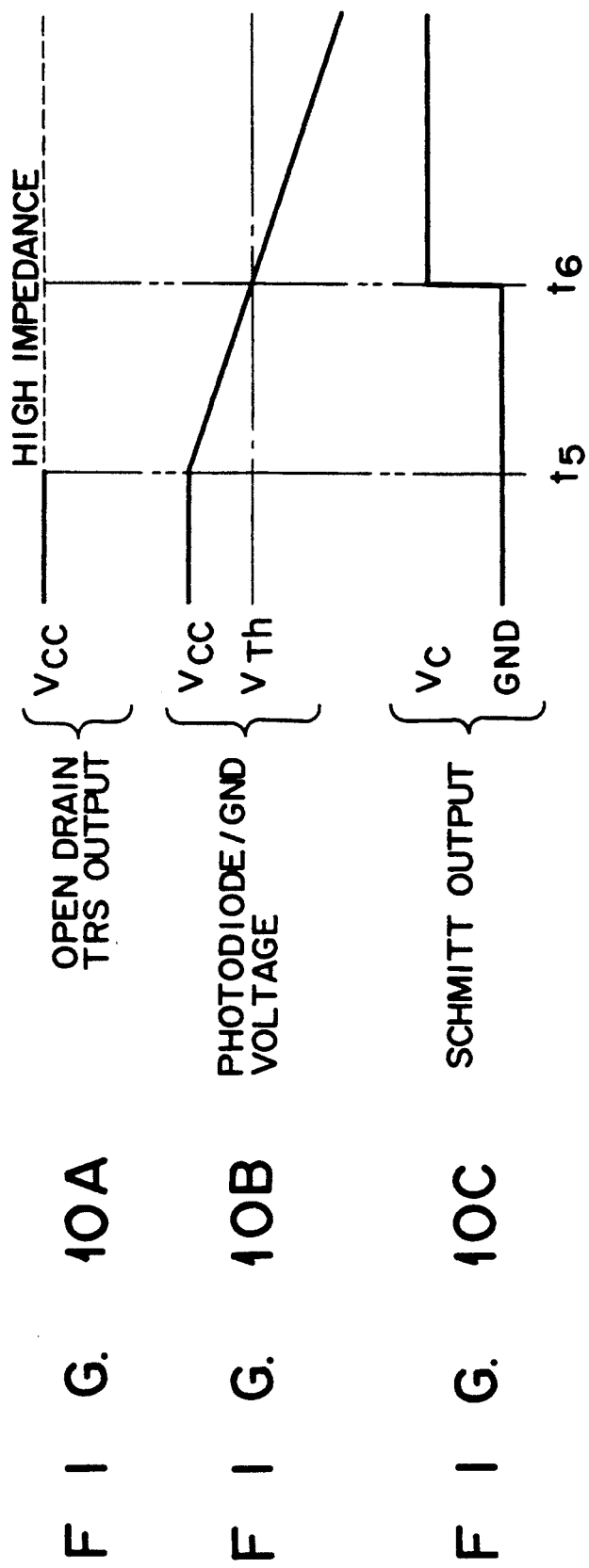

PHOTOMETER

BACKGROUND OF THE INVENTION

1. Field of the Invention

The present invention relates generally to a photometer, and more particularly, to a photometer employed in an optical device such as a camera.

2. Description of the Related Art

In these years, in photometer circuits of optical devices such as cameras, an incident light beam is converted to a photoelectric current by using a photodiode, and the photoelectric current is converted to a logarithmic compression voltage. Alternatively, the photoelectric current is accumulated in a capacitor for A/D conversion. In these cases, it is necessary to use diodes for compression and to use comparators and reference voltage generating circuits for A/D conversion, and bipolar ICs are employed.

On the other hand, processing circuits, such as exposure control circuits and display circuits, for receiving and processing outputs from the photometer circuits have been digitized for the reason of easy processing, and CPUs (Central Processing Unit) are used therefor. Accordingly, at least two types of ICs, i.e. bipolar ICs and CPUs, have been used for the photometer circuits and processing circuits of the optical device such as cameras.

However, it is disadvantageous, in terms of circuit dimensions and costs, to use such bipolar ICs and CPUs for photometry.

Further, CPUs which are manufactured by combining a bipolar process and a C-MOS process have been developed; however, the manufacturing process is complex and incurs high costs.

SUMMARY OF THE INVENTION

The object of the present invention is therefore to provide a photometer comprising an inexpensive, simple circuit which does not employ bipolar ICs and is constituted only by a photodiode for receiving an incident light beam and a CPU for processing a photoelectric voltage output from the photodiode.

According to an aspect of the present invention, there is provided a photometer for a camera, comprising a CPU having an input/output port connected to an N-MOS type open drain transistor with its source grounded and to a C-MOS type input circuit for inverting an input voltage with a value higher than a predetermined threshold value and outputting the inverted voltage, a photodiode, having a cathode and an anode, for outputting a photoelectric current corresponding to an incident light amount, the anode being connected to the input/output port, the cathode being connected to a power source, and a capacitor connected externally in parallel to said photodiode or constituted equivalently in the photodiode, wherein, for carrying out a photometric operation, the CPU includes charging means for turning on the transistor and charging the capacitor up to a predetermined potential, discharging means for turning off the transistor, after the charging, and releasing the charge in the capacitor by means of the photoelectric current, counting means for counting a time from the turning-off of the transistor to the inversion of the output of the C-MOS type input circuit, and luminance detecting means for detecting the luminance of an object on the basis of the count value of the counting means.

According to another aspect of the present invention, there is provided a photometer for a camera, comprising a CPU of MOS structure for controlling the operation of the camera, the CPU including an inverter for inverting an input having a value exceeding a first predetermined potential, and a switching element connected between an input terminal of the inverter and a second predetermined potential, a photodiode, connected directly to the input terminal of the inverter, for generating a photoelectric current corresponding to the luminance of an object, and a junction capacitance in the photodiode or a capacitor connected externally in parallel to the photodiode, wherein said CPU renders the switching element conductive prior to the measurement of the luminance of the object, charges the junction capacitance or external capacitor to an initial state, starts the counting operation after the initial state is set, and renders the switching element nonconductive, thereby discharging the charge in the capacitor by means of the photoelectric current of the photodiode and counting the time until the output of the inverter is inverted as a result of the discharge, the counted time corresponding to the luminance of the object.

According to still another aspect of the present invention, there is provided a photometer of a camera, comprising a CPU of MOS structure including an inverter which inverts an output at a predetermined potential, a photodiode, connected to an input terminal of the inverter, for generating a photoelectric current corresponding to luminance, and a junction capacitance in the photodiode or a capacitor externally connected in parallel to the photodiode, wherein the CPU sets the charge state of the junction capacitance or external capacitor to the initial state, and comprises counting means for counting a time from the release of the initial state to the inversion of the inverter resulting from the discharge of the charge in the capacitor by means of the photoelectric current.

According to still another aspect of the present invention, there is provided a photometer of a camera, comprising a CPU having an output circuit capable of outputting a ground level or a power source voltage level and of setting its output terminal in a high-impedance state, and a C-MOS type input circuit for inverting an input voltage with a value higher than a predetermined threshold and outputting the inverted input voltage, a light-receiving element outputting a photoelectric current corresponding to an incident light amount, the light-receiving element having one end connected to a connection point between the output terminal of the output circuit and the input terminal of the input circuit, and having the other end connected to a terminal of a predetermined voltage level, and a capacitor connected externally in parallel to the photodiode or constituted equivalently in the photodiode, wherein, for carrying out a photometric operation, the CPU includes discharging means for outputting the ground level or power source voltage level to the outputting terminal of the output circuit, thereby initializing the charge level of the capacitor and then setting the output terminal in a high-impedance state and discharging the capacitor by means of the photoelectric current, counting means for counting a time from the start of the discharge to the inversion of the output of the input circuit, and luminance detecting means for detecting the luminance of an object on the basis of the count value of the counting means.

According to still another aspect of the present invention, there is provided a photometer of a camera, comprising a CPU having an open drain transistor, and an input circuit inverting an input voltage with a value exceeding a predetermined threshold and outputting the inverted input voltage, a photodiode for outputting a photoelectric current corresponding to an incident light amount, the photodiode having one end connected to a connection point between the drain of the transistor and the input terminal of the input circuit, and having the other end connected to a terminal having a predetermined voltage level, and a capacitor connected in parallel to the photodiode, wherein, for carrying out a photometric operation, said CPU includes charging means for turning on the transistor and charging the capacitor, discharging means for turning off the transistor, after the charging, and releasing the charge in the capacitor by means of the photoelectric current, counting means for counting a time from the turning-off of the transistor to the inversion of the output of the input circuit, and luminance detecting means for detecting the luminance of an object on the basis of the count value of the counting means.

According to still another aspect of the present invention, there is provided a photometric method for a photometer of a camera comprising a CPU of MOS structure including an inverter having its output inverted at a first predetermined potential and an output terminal capable of being set in a high-impedance state, a photodiode, connected to an input terminal of the inverter, for generating a photoelectric current corresponding to luminance, and a junction capacitance in the photodiode or a capacitor externally connected in parallel to the photodiode, the method comprising the steps of setting the output terminal at a second predetermined potential, thereby charging the junction capacitance or external capacitor, setting the output terminal in a high-impedance state, thereby discharging the charge from capacitance or capacitor by means of the photoelectric current of the photodiode, resulting in a change in potential of the inverter, and starting a time count operation, and ending the time count operation in response to the inversion of the output of the inverter, the time obtained by the time count operating indicating the luminance.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is block diagram showing a photometer according to the present invention;

FIG. 4 is a circuit diagram showing an important portion of a photometer according to a second embodiment of the invention;

FIG. 5 is a circuit diagram showing an important portion of a photometer according to a third embodiment of the invention;

FIG. 6 shows a threshold voltage characteristic for explaining the operation of the third embodiment;

FIGS. 7A, 7B and 7C are timing charts of the N-channel open drain transistors shown in FIG. 5, and illustrate the operation of the third embodiment of the invention;

FIG. 8 is a circuit diagram showing an important portion of a photometer according to a fourth embodiment of the invention;

FIG. 9 is a circuit diagram showing an important portion of a photometer according to a fifth embodiment of the invention;

FIGS. 10A, 10B and 10C are timing charts of the P-channel open drain transistors shown in FIG. 9, and illustrate the operation of the fifth embodiment of the invention; and FIG. 11 is a circuit diagram showing an important portion of a photometer according to a sixth embodiment of the invention.

DETAILED DESCRIPTION OF THE PREFERRED EMBODIMENT

Figure 2:
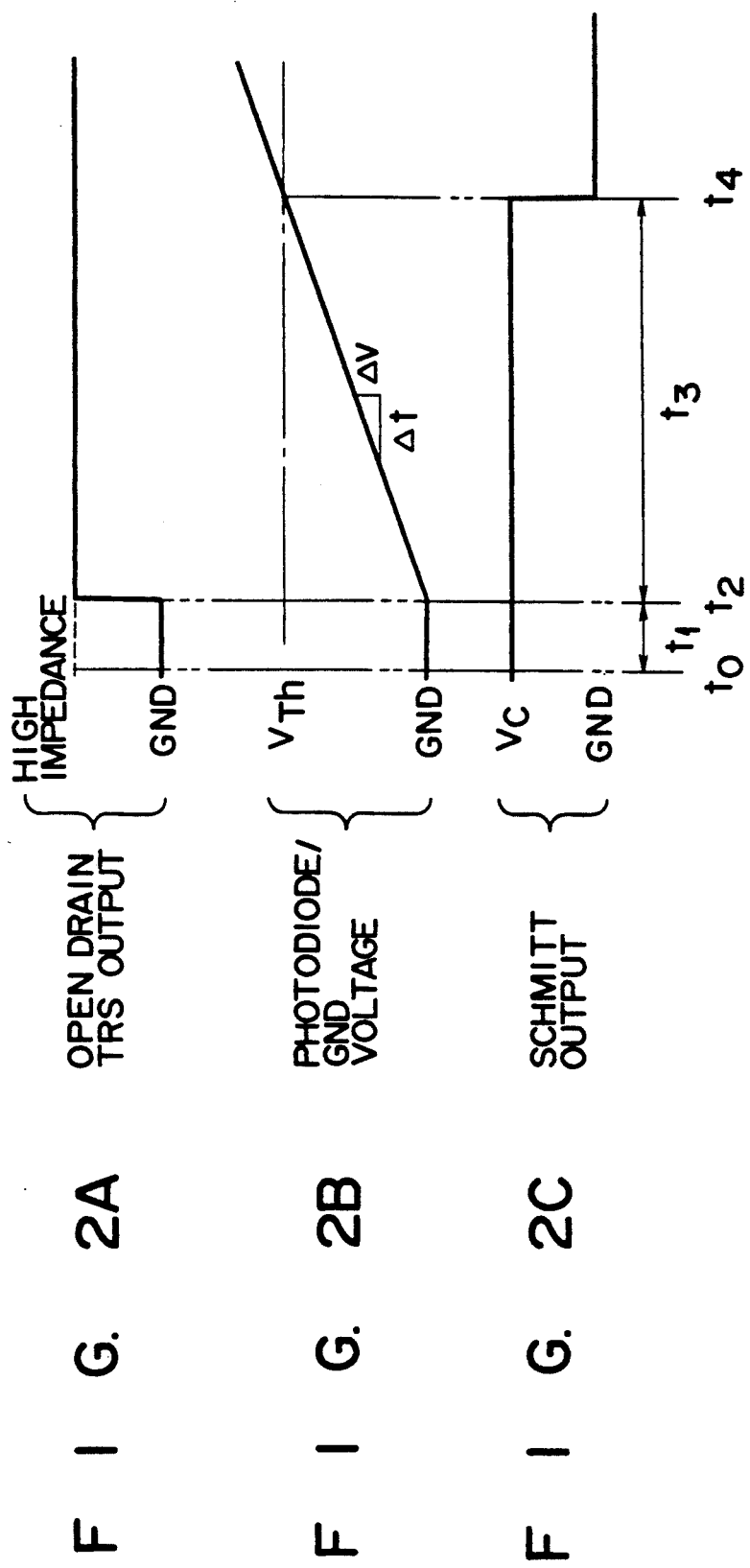
FIGS. 2A, 2B and 2C are timing charts for illustrating the operation of a first embodiment of the invention.

Preferred embodiments of the present invention will now be described with reference to the accompanying drawings.

FIG. 1 is a block diagram showing a photometer according to this invention. In FIG. 1, a CPU 2 executes a sequential control on the basis of a program stored in a ROM provided within the CPU 2, thereby controlling peripheral ICs, etc. A CPU (IC) 4 is provided for autofocusing (AF). The IC 4 ("AFIC 4") measures the distance between itself and an object in an infrared active method, and transferring the obtained data of distance to the CPU 2 by 8-bit serial communication. The AFIC 4 is connected to a light projector/receiver 10 comprising three IREDs 6 for light projection and one PSD 8 for light reception. Thereby, distance measurement can be made for three points in a photographing screen.

If the base length between the IREDs 6 and PSD 8 of the light projector/receiver 10 varies, the obtained distance data differs from that obtainable when the base length does not vary. Thus, correction operation is carried out on the basis of the data stored in an EEPROM 12. The EEPROM 12 is a non-volatile memory element and stores adjustment data for correcting, at the time of manufacture, errors in distance data and mechanical errors of the lens position at the time of converting distance data to lens position data.

An interface 14 is connected to the CPU 2, thereby activating the IREDs 6, a power source stabilizing circuit 16 for CPU power source $V_{DD}$, and a pre-driver for a motor driver 18 and a plunger driver 20. The motor driver 18 drives a film feed motor 22 and a photographing lens driving motor 24. The state of film feed is detected by an encoder 26, and the position of the driven lens is detected by an encoder 28. The detection data from the encoders 26 and 28 is fed to the CPU 2.

A shutter (not shown) of the camera is driven by a plunger 30. The start of the opening of the shutter is detected by an encoder 32, and the detection data from the encoder 32 is fed to the CPU 2.

On the other hand, a DX 34 detects the ISO sensitivity of a film. The detection value of the DX 34 is input to the CPU 2. A strobe 36, a liquid crystal display (LCD) panel 38 and a data print circuit 40 effect, respectively, emission of flashlight, display of mode, film frame number, etc., and printing of date in accordance with signals from the CPU 2.

A reset IC 42 resets "power on" of the CPU 2. Specifically, the reset IC 42 keeps the CPU 2 in the reset state until a power source voltage $V_{DD}$ of the CPU 2 reaches an operable voltage of the CPU 2 at the time of power-on. The reset IC 42 prevents the overrun of the CPU 2 when the power source voltage $V_{DD}$ is temporarily turned off.

Reference numerals 44 to 56 denote various switches. For example, a first release switch 44 operates when it a release button is half depressed. When the switch 44 is turned on, distance measurement is effected and the measured distance value is stored in the CPU 2. A second release switch 46 operates when the release button is fully depressed. When the switch 46 is operated, the photographing lens is actuated in accordance with the measured distance value, and exposure is controlled on the basis of photometric value. A strobe mode change-over switch 48 effects switching between a "pink-eye effect" light emission mode, a strobe off mode, and a strobe forcible operation mode. The "pink-eye effect" light emission mode is a mode in which a strobe operation is carried out to prevent "pink-eye effect" (described later).

LEDs 58 an 60 are display lamps provided within a finder, for indicating the completion of AF distance measurement and giving "close distance" alarm, "strobe light emission" alarm and "pink-eye effect" alarm. An LED 62 is an LED for self-mode display. The "pink-eye effect" means a phenomenon in which the eyes of an object look "pink" when the object is photographed by using the strobe 36. The "pink-eye effect" alarm is given when the occurrence of "pink-eye effect" is detected in advance, thus suggesting that the "pink-eye effect" light emission mode be selected by the strobe mode change-over switch 48.

A photodiode 64 is a light-receiving element for spot photometry and average photometry. The photodiode 64 is connected to an N-channel (N-ch) open drain transistor 66 and a Schmitt type inverter 68 in the CPU 2.

The persent photometer includes a circuit for comparing a voltage obtained by discharging a voltage accumulated in a parasitic capacitor 64a by a photoelectric current corresponding to incident light, with a threshold voltage of the Schmitt type inverter 68 in the CPU 2. Specifically, this circuit detects lightness/darkness. The cathode of the photodiode 64 is connected to a terminal Vc, and the anode thereof is connected to the input terminal of the inverter 68 and the drain of the N-ch open drain transistor 66. The source of the transistor 66 is connected to a ground (GND).

Figure 3:
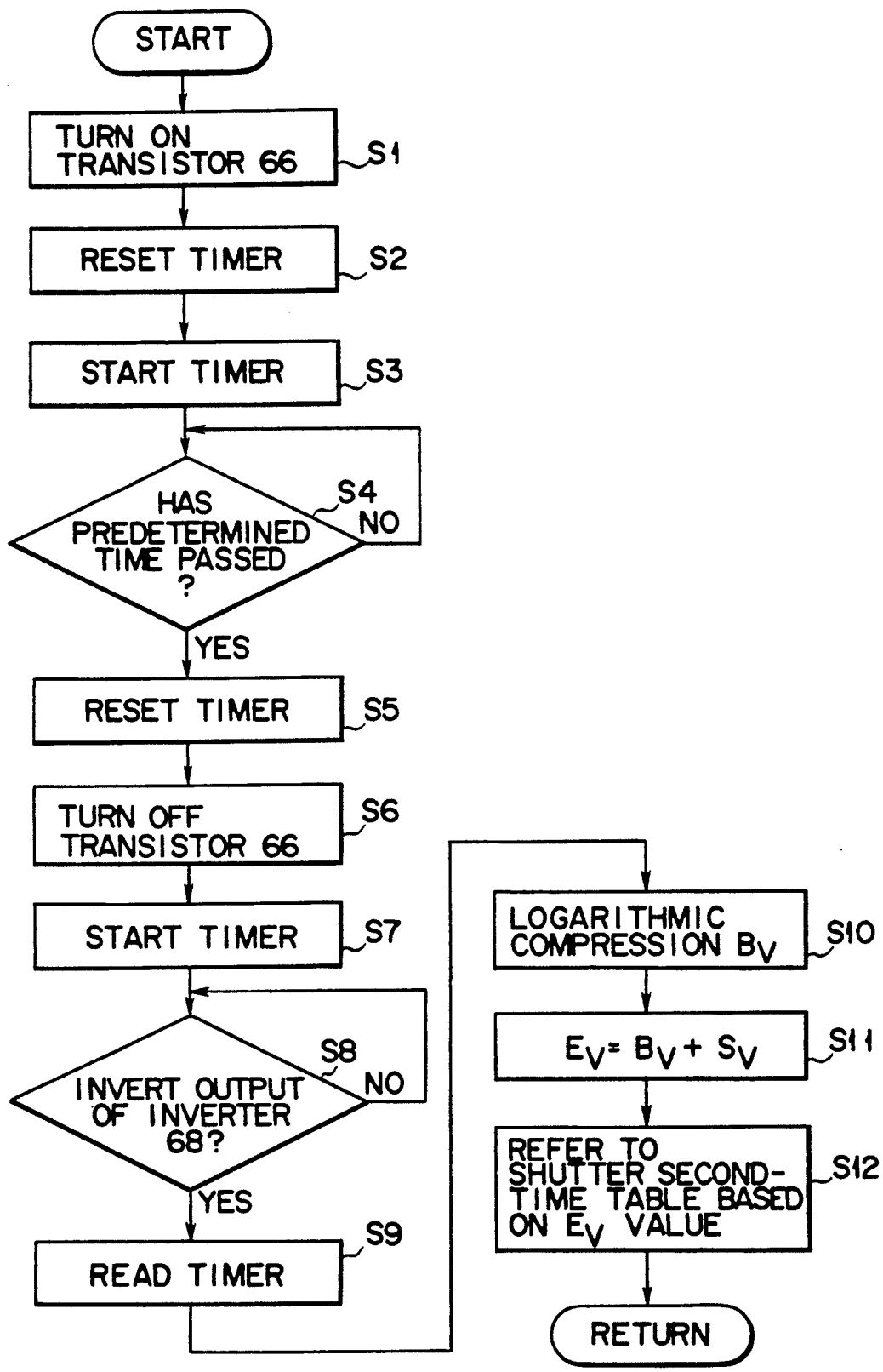
FIG. 3 is a flowchart for illustrating the operation of the first embodiment.

The operation of the above-described first embodiment will now be described with reference to the timing chart of FIG. 2 and the flowchart of FIG. 3.

At time $t_0$, the N-ch open drain transistor 66 is turned on (step S1). Accordingly, the reset IC 42 keeps a timer (not shown) in the CPU 2 in a reset state until the voltage supplied to the CPU 2 reaches an operable voltage (step S2). Then, the timer is started (step S3).

When a predetermined time ($t_1$) has passed (step S4) to time $t_2$, the timer is reset (step S5). Then, when the N-ch open drain transistor 66 is turned off (step S6), the output of the N-ch open drain transistor 66 is changed from a GND level to a high-impedance level. Thus, the photodiode 64 starts to discharge the electricity of Vc accumulated in the parasitic capacitance 64a by a photoelectric current corresponding to incident light. The charge of Vc in the capacitor 64a is released by a photoelectric current corresponding to incident light. Consequently, the anode potential of the photodiode 64 starts to rise from the GND level with a gradient corresponding to the photoelectric current. Then, the timer in the CPU 2 is started (step S7).

The raised potential reaches a threshold voltage ($V_{Th}$) of the Schmitt type inverter 68 (time $t_4$). The output of the inverter 68 varies from the Vc level to the GND level (step S8). When the output from the inverter 68 is inverted (time $t_4$), the value of the timer is read (step S9). In other words, a time $t_3$ between the time $t_2$, at which the output from the N-ch open drain transistor 66 changed from the GND level to the high-impedance level, and the time $t_4$, at which the output from the Schmitt type inverter 68 changed from the Vc level to the GND level, is measured by the timer in the CPU 2, thereby converting the photoelectric current to time.

Subsequently, logarithmic compression is carried out to find an object luminance value Bv (step S10). From the object luminance value Bv and film sensitivity Sv, a desired luminance value Ev is found (step S11). Thus, based on the luminance value Ev, the shutter second-time (shutter time in the unit of a second) is obtained by referring to a table.

According to the first embodiment as described above, the incident light is converted to time by means of the photodiode 64 and the N-ch open drain transistor 66 and Schmitt type inverter 68 in the CPU, thereby easily A/D converting the photoelectric current.

A second embodiment of the invention wherein the photometer of this invention is applied to a photometer having two or more photometric regions will now be described.

FIG. 4 is a circuit diagram showing an important part of the photometer of the second embodiment.

In the first embodiment, the input light amount was converted to time by utilizing the parasitic capacitor 64a of the photodiode 64. In this case, the gradient $\Delta V/\Delta t$ of the obtained voltage depends on the characteristics (a variance in parasitic capacitance, a light-receiving area) of the photodiode. Thus, when a plurality of photometric areas are subjected to photometry, the obtained output varies even if the luminance is unchanged.

To solve this problem, in the second embodiment, a capacitor 70 is connected between the anode and cathode of the photodiode 64. A photodiode 72 connected in parallel to the photodiode 64 is connected to an N-ch open drain transistor 74 and a Schmitt type inverter 76 in the CPU 2. In addition, a capacitor 78 is connected in parallel between the anode and cathode of the photodiode 72. By suitably controlling the capacitances of capacitors 70 and 78, the gradient $\Delta V/\Delta t$ is adjusted.

The operation of the second embodiment having the above structure will now be described.

The operation of the second embodiment is similar to that of the first embodiment. Suppose that the capacitance of capacitor 70 is $C_{70}$ and the capacitance of capacitor 78 is $C_{78}$, and photoelectric currents $I_{72}$ and $I_{64}$ are generated from the spot photometry diode 72 and average photometry diode 64 when a predetermined amount of light is radiated on the diodes 72 and 64. In this case, a light receiving area ratio $\alpha$ of the photodiodes 72 and 64 is given by $$\alpha = I_{64}/I_{72} \tag{1}$$

The value obtained by converting the photoelectric currents to time is given by $$\alpha t_{11}/C_{70} = t_{12}/C_{78} \tag{2}$$

where $t_{11}$ is the time conversion value of the average photometry photodiode 64, and $t_{12}$ is the time conversion value of the spot photometry photodiode 72. It is supposed that the values of $C_{70}$ and $C_{78}$ are so large that the parasitic capacitance is negligible. As can be seen from equation (2), if the capacitances of $C_{70}$ and $C_{78}$ are $\alpha/C_{70} = 1/C_{78}$, $t_{11} = t_{12}$. When the same amount of light is radiated on the average photometry photodiode 64 and spot photometry photodiode 72, the identical time conversion value is obtained.

The spot photometry photodiode 72 is designed for spot photometry for measuring the luminance of a major object, and the average photometry photodiode 64 is designed for average photometry for measuring the luminance of a background. When the difference in luminance of the major object and background is more than a predetermined value, a "backlighted" state is detected and a strobe photographing is carried out. The "backlighted" state is detected when the following equation (3) is established:

$$\alpha \beta C_{78} = C_{70} \tag{3}$$

where $\beta$ is a given positive integer number, indicating a level of "backlighting". Supposing that $\beta$ is 2, $t_{11}$ is equal to $t_{12}$ if the following equation (4) is established:

$$2\alpha I_{72} = I_{64} \tag{4}$$

If $2\alpha\ I_{72} > I_{64}$, $t_{11} > t_{12}$, and if $2\alpha\ I_{72} < I_{64}$, $t_{11} < t_{12}$.

Equation (4), $2\alpha\ I_{72} = I_{64}$, indicates the "backlighted" state in which half the amount of light radiated on the average photometry photodiode 64 has been radiated on the spot photometry photodiode 72. If $2\alpha\ I_{72} < I_{64}$, this means that less than half the amount of light radiated on the average photometry photodiode 64 has been radiated on the spot photometry photodiode 72. In other words, if $t_{11} \leq t_{12}$, the "backlighted" state can be detected.

Now suppose that average photometry and spot photometry are carried out simultaneously. If the output from the Schmitt type inverter 76 is at Vc level at the time of completion of the time conversion of average photometry in which the output of the Schmitt type inverter 68 changes from the Vc level to the GND level, it is understood that the time conversion of spot photometry has not been finished and the "backlighted" state remains.

As has been described above, according to the second embodiment, the difference in luminance between the major object and background for "backlighting" determination can be freely set by suitably selecting the capacitance values of the capacitors 70 and 78 connected to the photodiodes 64 and 72. In addition, the "backlighted" state can easily been detected only by detecting the time conversion state of spot photometry (i.e. the output state of Schmitt type inverter 76) at the time of completion of time conversion of average photometry.

A third embodiment of the invention will now be described with reference to FIGS. 5, 6 and 7.

In the first and second embodiments, the time conversion was carried out by using the threshold voltages of the Schmitt type inverters 68 and 76; however, the threshold voltages have dependency on the power supplied to the CPU 2 and the level for determining the photoelectric voltage may vary. In order to solve this problem, the anodes of the photodiodes 64 and 72 of the second embodiment are connected to cathodes of the diodes 80 and 82, as shown in FIG. 5. The anodes of the diodes 80 and 82 are connected to the power source Vc via a resistor 84 and to the drain of an N-ch open drain transistor 88 in the CPU 2 via a resistor 86. The source of the transistor 88 is connected to a ground (GND).

The operation of the third embodiment will now be described.

The ratio of resistances 84 and 86 is set to have a value of $\Delta V_{Th}/\Delta Vc$ of threshold voltage $V_{Th}$ of Schmitt type inverters 76 and 68, as shown in FIG. 6.

FIGS. 7A, 7B and 7C are timing charts. When the output of the N-ch open drain transistor (TRS) 88 changes from a high-impedance level to a GND level, the anode potentials of the diodes 82 and 80 are about $$\frac{Vc \times R_{86}}{R_{84} + R_{86}}$$

(where the resistance values of resistors 84 and 86 are $R_{84}$ and $R_{86}$). This value is equal to the threshold voltage of the Schmitt type inverters 76 and 68, as stated above. Since the outputs of the N-ch open drain transistors 39 and 35 are at the GND level, the anode potential of the photodiodes 72 and 64 is $$\frac{Vc \times R_{86}}{R_{84} + R_{86}} - V_B$$

(where $V_B$ is a forward voltage of diodes 82 and 80). Since the value, $$\frac{Vc \times R_{86}}{R_{84} + R_{86}}$$

is equal to the threshold voltage of the Schmitt type inverters 76 and 68, the anode potential of the photodiodes 72 and 64 is $V_{Th} - V_B$ and the charge of $Vc - (V_{Th} - V_B)$ is accumulated in the parasitic capacitor of the photodiodes 72 and 64.

The output of the N-ch open drain transistors 74 and 66 is changed from the GND level to the high-impedance level and the time conversion of photoelectric current is started. The charge accumulated in the parasitic capacitor of the photodiodes 72 and 64 is released in accordance with the amount of input light. When the anode potential of the photodiodes 72 and 64 reaches the potential $V_{Th}$ of the Schmitt type inverters 76 and 68, the output is inverted from the Vc level to the GND level and the time conversion is finished. In other words, the potential of the photodiodes 72 and 64 is $V_{Th} - V_B$ at the time of start of time conversion, and, when it reaches $V_{Th}$, the time conversion is finished. Thus, the parasitic capacitance of the photodiodes 72 and 64 is discharged by a voltage component of $V_{Th}-(V_{Th}-V_B)=V_B$ and the time conversion independent of power source voltage Vc can be performed.

As has been described above, according to the third embodiment of the invention, the time conversion of photoelectric voltage independent of power source voltage can be performed by means of resistors 84 and 86 and diodes 80 and 82.

A fourth embodiment of the invention will now be described with reference to FIG. 8.

In the first, second and third embodiments, the γ value of the light power source of the photodiodes 64 and 72 is about 1. Thus, a dynamic range is required for time conversion of photoelectric current. If the amount of input light is small, a long time is consumed for time conversion. Disadvantageously, this increases a release time lag of the camera.

In order to solve this problem, the anode of the photodiode 64 of the first embodiment is connected to the inputs of a plurality of Schmitt type inverters 90, 92, ..., n having different thresholds.

The operation of the fourth embodiment will now be described.

The threshold voltage $V_{Th}$ of the Schmitt type inverter 68 of the first embodiment is about Vc/2. The threshold voltages of the Schmitt type inverters 90, 92, ..., n are $V_{Th90}$, $V_{Th92}$, ..., $V_{Thn}$. Suppose that the Schmitt type inverter 90 is connected, and the threshold voltage $V_{Th90}$ is set to Vc/4.

As in the first embodiment, the time conversion is started. First, the output of the Schmitt type inverter 90 is inverted at a time corresponding to a given amount of input light. Then, the output of the Schmitt type inverter 68 is inverted after double the conversion time obtained by the inverter 90. If the conversion time obtained by the Schmitt type inverter 90 is longer than a predetermined value, the CPU 2 adopts the conversion time as an A/D conversion value of input light, and decreases the time required for time conversion. If the time obtained by the inverter 90 is shorter than the predetermined value, the CPU 2 adopts the conversion time obtained by the inverter 68 as an A/D conversion value of input light, and enhances the precision of the value.

According to the fourth embodiment, the CPU 2 includes a plurality of Schmitt type inverters having different threshold voltages, and the A/D conversion value of input light amount can be obtained dynamically. In addition, the release time lag of the camera can be decreased.

FIG. 9 is a circuit diagram showing a fifth embodiment of the photometer of the present invention.

In the above-described embodiments, N-channel type open drain transistors were employed. In the fifth embodiment, by contrast, P-channel ("P-ch") open drain transistors are used.

As is shown in FIG. 9, a capacitor 96 is connected in parallel between the anode and cathode of a photodiode 94. A capacitor 100 is connected in parallel between the anode and cathode of a photodiode 98 connected in parallel to the photodiode 94. The photodiode 94 is connected to a P-ch open drain transistor 102 and a Schmitt type inverter 104 in the CPU 2. Similarly, the photodiode 98 is connected to a P-ch open drain transistor 106 and a Schmitt type inverter 108 in the CPU 2. The anodes of the photodiodes 94 and 98 are grounded.

The operation of the fifth embodiment will now be described with reference to FIGS. 10A, 10B and 10C.

When the P-ch open drain transistor 102 is turned on, a timer (not shown) in the CPU 2 is reset and thereafter the timer is started. When a predetermined time has passed, the timer is reset and the P-ch open drain transistor 102 is turned off. Subsequently, the voltage Vc accumulated in the parasitic capacitor 96 is discharged by a photoelectric current corresponding to the input light amount. At time $t_5$, the timer in the CPU 2 is started. At time $t_6$ when the output of the Schmitt type inverter 102 is inverted, the value of the timer is read. More specifically, the timer in the CPU 2 measures the time between time $t_5$, at which the output of the P-ch open drain transistor 102 changed from the Vcc level to the high-impedance level, and time $t_6$ at which the output of the Schmitt type inverter 102 changed from the GND level to the Vc level. Thus, luminance data is obtained as photoelectric current/time conversion value.

As has been described above, according to the fifth embodiment, photoelectric current can easily be A/D converted by using P-ch open drain transistors.

FIG. 11 is a circuit diagram showing an important part of the photometer according to a sixth embodiment of the invention.

In the sixth embodiment, the output transistors used in the preceding embodiments are changed from open drain type transistors to a 3-state CMOS circuit.

In FIG. 11, a photodiode 112, to which a junction capacitance 110 is connected in parallel, is connected to CMOS transistors 114 and 116 in the CPU 2. The transistors 114 and 116 are connected to a Schmitt type inverter 118.

With this structure, when the transistor 116 in the CMOS circuit is turned on, the same effect as in the case where the aforementioned NMOS transistor is turned on is obtained. When the transistors 114 and 116 are turned off, the high-impedance state is attained.

Additional advantages and modifications will readily occur to those skilled in the art. Therefore, the invention in its broader aspects is not limited to the specific details, representative devices, and illustrated examples shown and described herein. Accordingly, various modifications may be without departing from the spirit or scope of the general inventive concept as defined by the appended claims and their equivalents.

What is claimed is:

1. A photometer for a camera, comprising:

a CPU having an input/output port connected to an N-MOS type open drain transistor with its source grounded and to a C-MOS type input circuit for inverting an input voltage with a value higher than a predetermined threshold value and outputting the inverted voltage;

a photodiode, having a cathode and an anode, for outputting a photoelectric current corresponding to an incident light amount, said anode being connected to said input/output port, said cathode being connected to a power source; and a capacitor connected externally in parallel to said photodiode or constituted equivalently in said photodiode, wherein, for carrying out a photometric operation, said CPU includes:

charging means for turning on said transistor and charging said capacitor up to a predetermined potential;

discharging means for turning off said transistor, after the charging, and releasing the charge in said capacitor by means of said photoelectric current;

counting means for counting a time from the turning-off of the transistor to the inversion of the output of the C-MOS type input circuit; and luminance detecting means for detecting the luminance of an object on the basis of the count value of the counting means.

2. A photometer according to claim 1, further comprising:

a resistor group for dividing the power source voltage, a voltage corresponding to said threshold voltage appearing at a connection point of the resistor group; and a diode having an anode connected to the connection point of the resistor group and having a cathode connected to the input/output port.

3. A photometer for a camera, comprising:

a CPU of MOS structure for controlling the operation of the camera, the CPU including an inverter for inverting an input having a value exceeding a first predetermined potential, and a switching element connected between an input terminal of the inverter and a second predetermined potential;

a photodiode, connected directly to the input terminal of the inverter, for generating a photoelectric current corresponding to the luminance of an object; and a junction capacitance in said photodiode or a capacitor connected externally in parallel to said photodiode, wherein said CPU renders the switching element conductive prior to the measurement of the luminance of the object, charges the junction capacitance or external capacitor to an initial state, starts the counting operation after the initial state is set, and renders the switching element non-conductive, thereby discharging the charge in the capacitor by means of the photoelectric current of the photodiode and counting the time until the output of the inverter is inverted as a result of the discharge, the counted time corresponding to the luminance of the object.

4. A photometer according to claim 3, wherein said CPU includes at least two input terminals to which said switching element and said inverter are connected respectively, two photodiodes are connected to said two input terminals, two capacitors are connected externally in parallel to said two photodiodes, and capacitances $C_1$ and $C_2$ of the two capacitors have the relationship of $$\alpha/C_1 = 1/C_2$$

where $\alpha$ is a ratio of light receiving areas of the two photodiodes.

5. A photometer according to claim 3, wherein one end of said photodiode is connected to a power source, and the photometer further comprises:

a series circuit having one end connected to the power source, said series circuit comprising first and second resistors;

a diode connected between a connection point between the other end of the photodiode and said input terminal, and a connection point between the first and second resistors; and a second switching element in the CPU, connected to the other end of the series circuit of the first and second resistors.

6. A photometer of a camera, comprising:

a CPU of MOS structure including an inverter which inverts an output at a predetermined potential;

a photodiode, connected to an input terminal of the inverter, for generating a photoelectric current corresponding to luminance; and a junction capacitance in said photodiode or a capacitor externally connected in parallel to the photodiode, wherein said CPU sets the charge state of the junction capacitance or external capacitor to the initial state, and comprises counting means for counting a time from the release of the initial state to the inversion of the inverter resulting from the discharge of the charge in the capacitor by means of the photoelectric current.

7. A photometer according to claim 6, wherein said CPU includes at least two input terminals to which said inverter is connected, two photodiodes are connected to said two input terminals, two capacitors are connected externally in parallel to said two photodiodes, and capacitances $C_1$ and $C_2$ of the two capacitor have the relationship of $$\alpha/C_1 = 1/C_2$$

where $\alpha$ is a ratio of light receiving areas of the two photodiodes.

8. A photometer according to claim 6, further comprising:

a series circuit having one end connected to the power source, said series circuit comprising first and second resistors; and a diode connected between a connection point between the other end of the photodiode and said input terminal, and a connection point between the first and second resistors.

9. A photometer according to claim 6, wherein said input terminal is connected to a plurality of inverters having different voltages at which outputs thereof ar inverted.

10. A photometer of a camera, comprising:

a CPU having an output circuit capable of outputting a ground level or a power source voltage level and of setting its output terminal in a high-impedance state, and a C-MOS type input circuit for inverting an input voltage with a value higher than a predetermined threshold and outputting the inverted input voltage;

a light-receiving element outputting a photoelectric current corresponding to an incident light amount, said light-receiving element having one end connected to a connection point between the output terminal of the output circuit and the input terminal of the input circuit, and having the other end connected to a terminal of a predetermined voltage level; and a capacitor connected externally in parallel to said photodiode or constituted equivalently in said photodiode, wherein, for carrying out a photometric operation, said CPU includes:

discharging means for outputting the ground level or power source voltage level to the outputting terminal of the output circuit, thereby initializing the charge level of the capacitor, and then setting the output terminal in a high-impedance state and discharging the capacitor by means of the photoelectric current;

counting means for counting a time from the start of the discharge to the inversion of the output of the input circuit; and luminance detecting means for detecting the luminance of an object on the basis of the count value of the counting means.

11. A photometer of a camera, comprising:

a CPU having an open drain transistor, and an input circuit inverting an input voltage with a value exceeding a predetermined threshold and outputting the inverted input voltage;

a photodiode for outputting a photoelectric current corresponding to an incident light amount, said photodiode having one end connected to a connection point between the drain of the transistor and the input terminal of the input circuit, and having the other end connected to a terminal having a predetermined voltage level; and a capacitor connected in parallel to the photodiode, wherein, for carrying out a photometric operation, said CPU includes:

charging means for turning on said transistor and charging said capacitor;

discharging means for turning off said transistor, after the charging, and releasing the charge in said capacitor by means of said photoelectric current;

counting means for counting a time from the turning-off of the transistor to the inversion of the output of the input circuit; and luminance detecting means for detecting the luminance of an object on the basis of the count value of the counting means.

12. A photometer according to claim 11, wherein said capacitor comprises a junction capacitance occurring in the photodiode.

13. A photometric method for a photometer of a camera comprising:

a CPU of MOS structure including an inverter having its output inverted at a first predetermined potential and an output terminal capable of being set in a high-impedance state;

a photodiode, connected to an input terminal of the inverter, for generating a photoelectric current corresponding to luminance; and a junction capacitance in the photodiode or a capacitor externally connected in parallel to the photodiode, said method comprising the steps of:

setting the output terminal at a second predetermined potential, thereby charging the junction capacitance or external capacitor;

setting the output terminal in a high-impedance state, thereby discharging the charge from capacitance or capacitor by means of the photoelectric current of the photodiode, resulting in a change in potential of the inverter, and starting a time count operation; and ending the time count operation in response to the inversion of the output of the inverter, the time obtained by the time count operating indicating the luminance.

* * * * *